United States Patent
Swinamer et al.

[11] 3,863,245
[45] Jan. 28, 1975

[54] INTERCOMMUNICATION NETWORK FOR RETAIL CHECK OUT COUNTERS

[76] Inventors: Roy V. Swinamer, 22 Cercuit Dr., Binghamton, N.Y. 13903; C. Carroll Larkin, 1 Benita Blvd., Vestal, N.Y. 13850

[22] Filed: June 21, 1973

[21] Appl. No.: 371,991

[52] U.S. Cl. .............................. 340/286, 340/366 B
[51] Int. Cl. .............................................. H04q 5/00
[58] Field of Search..... 340/286 R, 147 A; 186/1 A, 186/1 B, 1 R; 179/1 DD, 1 H

[56] References Cited
UNITED STATES PATENTS
3,182,357  5/1965  Tuttle .............................. 340/286

Primary Examiner—Harold I. Pitts

[57] ABSTRACT

An integrated check-out counter system for supermarkets and other retail stores, the system being adapted to expedite customer transactions, to improve accounting procedures and to strengthen store security. Each check-out counter in the store is serviced by a bagger and a cashier who are linked to each other and to a master station installed in the manager's booth by an intercommunication network. In operation, a customer having selected items to be purchased and having placed them in a cart, wheels the cart to one of the counters where the bagger removes the items from the cart and calls their prices to the cashier over the link therebetween, the items then being bagged. The cashier enters the cost of each item into a cash register and when the last item is bagged the cashier rings up the total. The customer then pays the cashier and departs with the bagged items, thereby completing the transaction and clearing the counter for the next customer. When in need of price information, the baggers at the various counters are able to communicate with the master station, and when credit clearance is needed for a customer seeking to cash a check, the cashiers communicate with the master station, the same network also being used to report shoplifting and other incidents requiring the manager's attention.

5 Claims, 5 Drawing Figures

PATENTED JAN 28 1975　　　　　　　　　　　　　　　　3,863,245
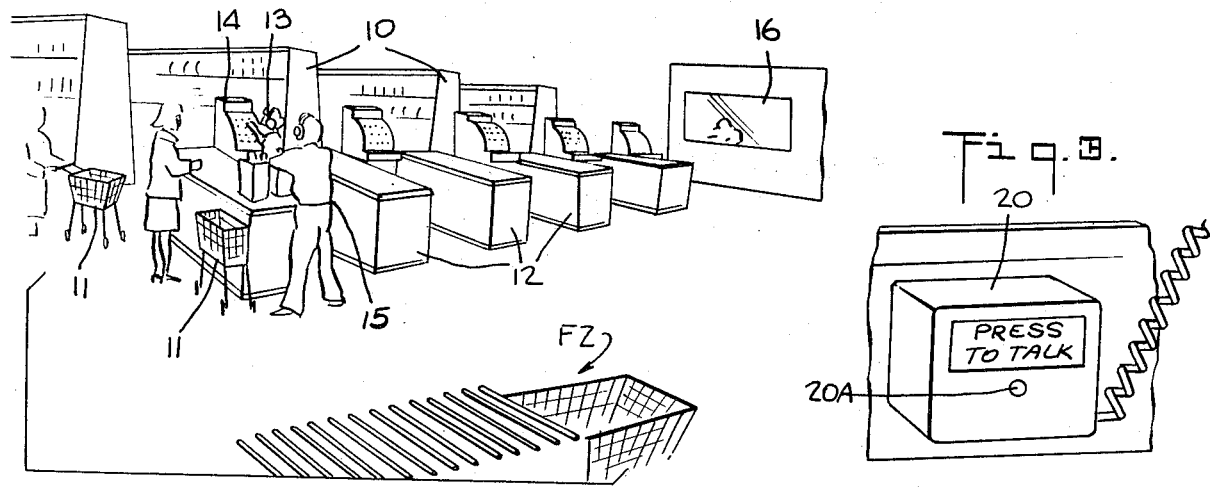
Fig. 1.
Fig. 3.
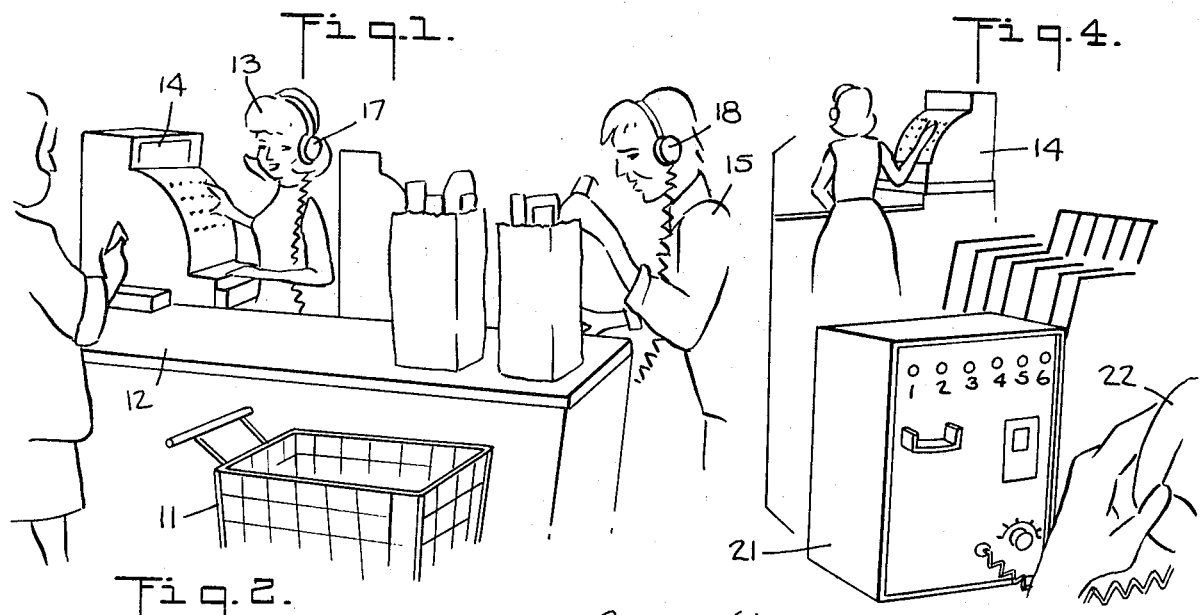
Fig. 2.
Fig. 4.
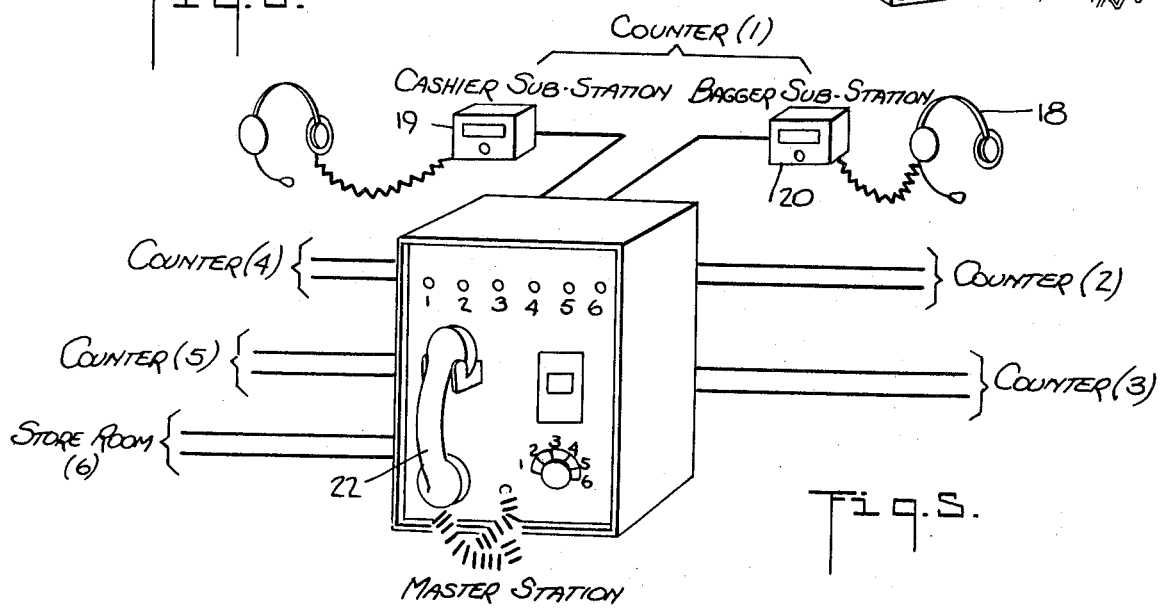
Fig. 5.

INTERCOMMUNICATION NETWORK FOR RETAIL CHECK OUT COUNTERS

BACKGROUND OF THE INVENTION

The invention relates generally to check-out systems for supermarkets and other retail establishments having a group of identical check-out counters, and more particularly to an integrated system in which each counter is serviced by a bagger and a cashier who are linked together and to a master station by an intercommunication network.

In the United States, the modern supermarket has, in large measure, supplanted the traditional grocery store and other retail outlets. The supermarket approach to retailing is making inroads throughout the world and is no longer limited to food items, for it has been extended to soft goods, hardware and other articles that lend themselves to shelf storage and direct handling by customers. The success of this technique is largely based on the fact that all merchandise for sale is displayed on rows of shelves or bins separated by aisles traversed by shoppers who push carts into which they place selected items.

Thus instead of having a store clerk remove items selected by the customer from the shelves, in which case the clerk can only accommodate one customer at a time, the customer acts as his own clerk and it becomes possible for a large number of customers to serve themselves at the same time. And because the customer has direct access to the merchandise, sales may be induced by promotional material carried on the boxes and containers.

A supermarket is capable of handling a large volume of business. For this reason, it must be equipped with several check-out counters, each having a cash register operated by a cashier who not only enters the price of each item in the register and accepts payment for the purchase, but who in many instances also bags the items. In some cases, particularly during busy periods, the cashier is assigned an assistant whose sole function is to bag the items.

In many markets, one of the check-out counters is designated as a rapid check-out facility and is reserved for customers having only a few items to be handled and who do not wish to get in line with other customers whose carts are more heavily loaded and therefore require a longer check-out time. But even with rapid check-out counters, present-day procedures in supermarkets leave much to be desired in terms of speed, efficiency and convenience to the customer.

In the typical supermarket, the volume of traffic in peak periods is such that the check-out facilities are inadequate, causing long lines to be formed at each counter. Because of the slowly moving lines, some customers become impatient and and simply abandon their filled carts. This not only results in the loss of trade, but it also becomes necessary for store personnel to return the abandoned items to the shelves. Also with current procedures, the customer is required to transfer the items from his cart to the counter and after the transaction is completed, the customer is expected to return the empty cart to a free cart zone near the store entrance. But what often happens is that the customer leaves the cart adjacent the counter, thereby obstructing the counter area. Because in the typical store, the carts are unsupervised, one usually finds empty carts scattered through the market.

Since the cashiers at the check-out counters must examine each item to determine its price, the cashiers are often overtaxed at peak hours, particularly when some items are unmarked and it becomes necessary for the cashier to shout out a request for price information from the manager or other store personnel. As a result, the margin of error is increased during busy periods, and this may give rise to customer dissatisfaction as well as income losses.

In the typical supermarket, the manager's booth is located so that he is able to observe the check-out counters and all corners of the store in order to maintain surveillance thereover. But since the manager has many other duties, his surveillance is intermittent and he may not observe shoplifting or other illicit actions. On the other hand, the cashiers and other personnel may detect a shoplifter, but it is not their function to take steps to arrest such activity, but only to advise the manager thereof. With existing procedures, this is difficult to do, especially in a busy supermarket, for there is no communication link between the counters and the manager's booth.

SUMMARY OF THE INVENTION

In view of the foregoing, the main object of this invention is to provide an integrated system for check-out counters wherein each counter is serviced by a bagger and a cashier who are linked to each other and to a master station in the manager's booth by an intercommunication network that functions to expedite transactions, to reduce the margin of error and to improve store security.

More particularly, it is an object of this invention to provide an intercome network for a supermarket or other retail outlets in which each bagger calls out the price of each item to the cashier before it is bagged, and the cashier then enters the price in the cash register, the bagger communicating with the master station when price information is required and the cashier communicating with the same station when customer credit information is necessary, the same network being used to transmit security alarms to the master station.

Among the advantages gained by a system according to the invention are the elimination of congestion at the check-out counters and the more effective and orderly handling of a large volume of traffic, improved security because of the ability of the cashier and bagger to communicate with the master station in the event an improper action is detected, and greater convenience to the customers because of the shortened transaction time.

Since the cashier is relieved of all duties other than the operation of the cash register and the acceptance of payment, the cashier is free of distraction and is able to function more efficiently. And since the bagger works next to the cart, he not only acts to call the prices and to bag the items, but he also sees to it that the cart, after being emptied, is returned to the free zone to avoid obstructing the counter area. In effect, therefore, the bagger supervises the counter area.

Briefly stated, these objects are attained in a system wherein a master station is installed at the manager's booth, this station being wired or otherwise coupled to two control boxes at each check-out counter, one being at the cashier's substation and the other at the bagger's substation. Each box is connected to a headset having a microphone and an earphone.

The network connections are such that the bagger's headset is normally linked to the cashier's headset at each counter. When either the bagger or the cashier at a given counter presses a call button at his control box, this activates an annunciator at the master station, indicating which of the counters is calling. The manager or operator at the master station, then sets a multi-position selector switch to the calling counter and lifts a telephone handset from its cradle, the cradle switch functioning to connect the manager's handset to the headset at the calling counter.

Thus, in operation, as the bagger at each counter transfers items from the cart to a bag, he calls the prices thereof to the cashier over the link therebetween and the cashier enters the prices into the cash register. But if price information is needed, the bagger presses his control box button to make contact with the master station which supplies this information. After all items have been bagged and the prices thereof registered, the cashier then totals the amounts registered and accepts payment from the customer, but if the customer wishes to cash a check, the cashier presses his control box button to make contact with the master station to obtain credit clearance for the check.

The same network may be used to interface the cash register at the various check-out counters with a computer or accounting machine at the master station. In this way the totals entered at the registers are transmitted to the master station in digital terms by carrier telephony or other expedients which avoid interference with audio communication. At the master station the digital signals are intercepted and fed to a computer or accounting machine which maintains a running audit on the store accounts.

OUTLINE OF DRAWINGS

For a better understanding of the invention as well as other objects and further features thereof, reference is made to the following detailed description to be read in conjunction with the accompanying drawings, wherein FIG. 1 is a perspective view of a supermarket having check-out counters and a manager's booth equipped with an intercom network according to this invention;

FIG. 2 illustrates the link between the bagger and cashier at one of the counters;

FIG. 3 shows one of the control boxes at the counter;

FIG. 4 shows the master station in the manager's booth; and

FIG. 5 is a schematic diagram of the intercom network.

DESCRIPTION OF THE INVENTION

Referring now to FIG. 1, there is shown a supermarket or other retail store in which merchandise to be sold is stored and displayed on shelves 10, set up in rows to permit shoppers to travel in the aisles between rows and to pick items from the shelves and place them in wheeled carts 11. These carts, when empty, are kept in a free zone FZ near the store entrance, so that an arriving shopper can take an available cart and then wheel it into the aisles and select the items he wishes to purchase.

The store is provided with a group of parallel check-out counters 12, each of which is serviced by a bagger-cashier team. Cashier 13 is seated before a cash register 14 positioned adjacent the input end of the counter, whereas bagger 15 works near the output end of the counter. The manager and other service personnel are stationed in a manager's booth 16 having a large window from which all operations carried out in the store can be observed.

The physical arrangement of the supermarket illustrated in FIG. 1, is no different from a conventional supermarket, but for the intercommunication network, to be later described, and the resultant absence of congestion at the counters at peak periods, for traffic flow is smooth and orderly. As shown in FIG. 2, the cashier 13 is equipped with a headset 17 combining a microphone and an earphone, and the bagger 15 is equipped with a similar headset 18. These headsets are connected to substation control boxes 19 and 20 mounted on the side of the counter at the bagger and cashier substations, one of which is shown in FIG. 3. Each control box is provided with a call press button such as button 20A on the bagger's box, whose purpose will be later explained.

As shown in FIG. 4, the master station 21 in the manager's booth is provided with an annunciator in the form of a series of pilot-light indicators numbered 1 to 6. Assuming a supermarket with five check-out counters, indicators 1 to 5 represent these counters, whereas indicator 6 represents another point in the store such as the meat counter or stock room which may be provided with a control box and headset similar to that of the check-out counters.

The master station is provided with a telephone handset which normally rests on a cradle switch 23, a press switch 24 and a multi-position selector switch 25 having as many positions as there are indicators, plus an omni-substation position, so that the master station is able to communicate with any one substation in the network or with all concurrently.

FIG. 5 shows schematically the intercom network formed by master station 21 in combination with the substations at counters 1 to 5 as well as a substation at another point in the store, such as store room 6. It will be appreciated that the number of substations shown is merely by way of example and that in practice, the actual number may be greater or smaller, depending on the size of the supermarket. The degree of network sophistication depends also on what a given supermarket can afford.

The network arrangement is such that at each check-out counter, the bagger and cashier are normally linked together through the master station without the need for a switching action. Thus as each item is picked out of the cart by the bagger who always wears his headset, he calls the price thereof to the cashier before putting the item in the bag. The cashier, who always wears a headset, records the price in the cash register. The headset cables extending to the control boxes are long enough to give the cashier and bagger adequate freedom of movement.

In the event a given item is unmarked, the bagger presses the call button 20A on his control box 20. Assuming that the calling bagger is at counter 4, this will cause a buzzer to sound at the master station 21 and at the same time light up the pilot light indicator number 4. The manager, whose attention is attracted by the buzzer, then goes to the master station, and seeing that the number 4 indicator is lit, sets selector switch 25 to this number and lifts the handset 22 from cradle 23, thereby activating the cradle switch.

This switching action breaks the buzzer circuit and connects handset 22 to the bagger substation at counter 4, so that now the bagger is no longer linked to the cashier but to the master control, and he may inquire as to the price of the unmarked item. And should the cashier wish to obtain credit information in connection with a check to be cashed, the cashier makes contact with master control by pressing the cashier substation call button.

It is to be noted that when either the bagger or the cashier calls master control, the particular substation calling is isolated from the other substation and remains in such condition until the receiver 22 in master control is returned to the cradle 23, at which time the substations are returned to normal communication between bagger and cashier.

The control boxes may be provided with buzzers so that should the manager wish to call a particular counter, he can do so by setting selector switch 25 to the desired counter number, and then press call switch 24 to ring the counter, the manager lifting the handset to speak to the counter. Or the selector switch may be set to a position connecting master control to all substations in the network so that the manager can address all counter personnel. The same intercom network may be extended to include other points in the store, such as the meat locker, the store room, etc.

It will be appreciated that the amplifiers and the switching and indicator circuits in the intercom network are of the type which are ordinarily found in standard intercom systems and are within the existing state of the art. The present invention resides in an intercom system wherein each counter is provided with a pair of substations that are normally linked together so that each bagger is able to communicate only with the cashier at the same counter and the bagger-cashier team at each counter can, if necessary, communicate with master control. Master control, on the other hand, can communicate with any one team or with all teams at the same time.

Because of the intercom link between the counters and master control, one can use the same link for accounting purposes by interfacing the cash registers at the counters with the cashier control boxes to permit transmission to master control of digital data generated in the register indicative of the transactions carried out at the counters. Because the cash registers are in concurrent use, a carrier telephony system is used in which each register is assigned a distinct carrier frequency to prevent interference between registers and with the audio communication system.

At the master control, the carrier signals are segregated and demodulated and fed to an appropriate computer or accounting machine. The same lines from the substations may be used to transmit alarm signals to master control should a cashier or bagger detect a shoplifter or any other incident requiring the manager's attention.

While there has been shown a preferred form of intercom network to improve supermarket operations, it is to be understood that many changes and modifications may be made therein without departing from the essential spirit of the invention.

We claim:

1. A supermarket system for expediting transactions, such system comprising:
   A. a group of identical check-out counters each serviced by a cashier and a bagger whose duties are performed at a cashier substation and a bagger substation;
   B. a control box at each substation and a headset wired thereto, said box including a call button;
   C. a manager's booth; and
   D. a master station installed in said booth and having an annunciator provided with indicators, one for each counter, a multi-position selector switch, one position for each counter, and a telephone set wired to said master station, said master station being connected to the control boxes at said counters whereby the cashier and bagger at each counter are linked to each other through the master station, and when a call button is pressed by either the cashier or bagger to activate a related indicator, the selector switch may be set to the calling counter to link the headset of the caller at the calling counter to the telephone set at the master station.

2. A system as set forth in claim 1, further including a substation control box at another point in said supermarket to effect a link thereto.

3. A system as set forth in claim 1, further including an additional position on said switch to effect a simultaneous link with all of said substations.

4. A system as set forth in claim 1, further including a cash register at each cashier's substation and an interface between said register and said cashier's control box to transmit the totals registered by said register to said master station.

5. An intercommunication network for a supermarket provided with a group of checkout counters and a manager's booth, said network including, at each counter, a first control box and a headset wired thereto for use by a cashier, a second control box and a headset wired thereto for use by a bagger, a master station at the manager's booth wired to the control boxes at all of said counters and having a telephone set wired thereto whereby the cashier and the bagger at each counter are linked together through the master station, switch means at the control boxes to call the master station and selector means at the master station to connect the telephone set to either the cashier and bagger at the calling counter.

* * * * *